United States Patent
Koto et al.

(10) Patent No.: US 8,892,325 B2
(45) Date of Patent: Nov. 18, 2014

(54) VEHICLE MOTION CONTROLLER

(75) Inventors: Hideaki Koto, Anjo (JP); Toshihisa Kato, Handa (JP)

(73) Assignee: Advics Co., Ltd., Kariya-Shi, Aichi-Ken (JP)

(*) Notice: Subject to any disclaimer, the term of this patent is extended or adjusted under 35 U.S.C. 154(b) by 171 days.

(21) Appl. No.: 13/075,955

(22) Filed: Mar. 30, 2011

(65) Prior Publication Data

US 2011/0246017 A1  Oct. 6, 2011

(30) Foreign Application Priority Data

Mar. 30, 2010  (JP) ................. 2010-078208

(51) Int. Cl.
*G06F 19/00* (2011.01)
*B60K 28/16* (2006.01)
*B60T 8/1755* (2006.01)

(52) U.S. Cl.
CPC ......... *B60T 8/17554* (2013.01); *B60T 2230/03* (2013.01)
USPC ............................................. 701/70; 180/197

(58) Field of Classification Search
CPC ....... B60T 8/171; B60T 8/172; B60T 8/1755; B60T 8/17551; B60T 8/17554
USPC .............. 701/29, 70, 82, 83, 90, 91
See application file for complete search history.

(56) References Cited

U.S. PATENT DOCUMENTS

| | | | |
|---|---|---|---|
| 4,992,301 A | 2/1991 | Shishiguchi et al. | |
| 6,139,120 A * | 10/2000 | Fukada | ................. 303/146 |
| 6,263,261 B1 | 7/2001 | Brown et al. | |
| 6,324,446 B1 | 11/2001 | Brown et al. | |
| 6,338,012 B2 | 1/2002 | Brown et al. | |
| 6,496,758 B2 | 12/2002 | Rhode et al. | |
| 6,834,218 B2 | 12/2004 | Meyers et al. | |
| 7,027,903 B2 | 4/2006 | Meyers et al. | |
| 7,130,735 B2 | 10/2006 | Brown et al. | |
| 7,481,325 B2 * | 1/2009 | Simpson et al. | ........... 215/384 |
| 2005/0012392 A1 * | 1/2005 | Kato et al. | ................. 303/191 |
| 2006/0041366 A1 * | 2/2006 | Kato et al. | ................. 701/72 |
| 2006/0158031 A1 * | 7/2006 | Kummel et al. | ........... 303/146 |
| 2009/0248269 A1 * | 10/2009 | Yasui et al. | ................. 701/74 |

FOREIGN PATENT DOCUMENTS

| | | |
|---|---|---|
| JP | 10-081215 A | 3/1989 |
| JP | 04-008837 A | 1/1992 |
| JP | 10-329682 A | 12/1998 |

(Continued)

OTHER PUBLICATIONS

Machine translation of JP 11-255093 A.*

(Continued)

*Primary Examiner* — Fadey Jabr
*Assistant Examiner* — Aaron L Troost
(74) *Attorney, Agent, or Firm* — Buchanan Ingersoll & Rooney PC (57) ABSTRACT

If an actual lateral acceleration is equal to or greater than a target lateral acceleration Gth and at least one of a steering angle lateral acceleration Gys and a yaw-rate lateral acceleration Gyy is less than the target lateral acceleration Gth, the increase of the W/C pressure of the vehicle to be controlled is inhibited. Accordingly, it is possible to suppress the increase in the roll angle by actively generating the understeering to suppress rolling and to early suppress an increase in understeering if the increase in understeering is made to be unnecessary.

18 Claims, 4 Drawing Sheets

(56) References Cited

FOREIGN PATENT DOCUMENTS

| JP | 11-255093 A | 9/1999 |
|---|---|---|
| JP | 2000-033866 A | 2/2000 |
| JP | 2001-219840 A | 8/2001 |
| JP | 2005-271821 A | 10/2005 |

OTHER PUBLICATIONS

Office Action (Notification of Reasons for Refusal) dated Feb. 14, 2012, issued by the Japanese Patent Office in corresponding Japanese Patent Application No. 2010-078208 and English Translation of Office Action. (6 pages).

* cited by examiner

VEHICLE MOTION CONTROLLER

BACKGROUND

The present invention relates to a vehicle motion control device that controls a pressure (hereinafter, referred to as "W/C pressure") generated in a wheel cylinder (hereinafter, referred to as "W/C") based on a motion condition in a lateral direction of a vehicle so as to suppress a roll of the vehicle.

JP-A-2001-219840 discloses a system that can control the rolling stability of a vehicle. In the system, if a lateral acceleration is generated at the time of turning, understeering is generated to cause lateral sliding by increasing the braking force of a turning-outside front wheel so that a greater difference in braking force is generated between the right and left wheels as the roll angle becomes greater than a threshold value, and causing a yaw torque. Accordingly, the rolling stability is controlled so that a vehicle does not roll by decreasing the roll angle of the vehicle using the reverse lateral acceleration generated with the understeering in the meantime.

However, since it is not necessary to generate understeering any more in a situation where great understeering is already generated or a situation where a driver returns the steering wheel, it is not preferable that the increase in braking force of the turning-outside front wheel is continuously maintained.

In a generic car, the lateral sliding is caused by generating the understeering is effective. However, in a large-sized vehicle such as a truck, if a braking force is given to the turning-outside front wheel by employing the above-mentioned control, a pitching phenomenon about the turning-outside front wheel, that is, a phenomenon that a nosedive (a state where the vehicle body is inclined forward) is caused about the turning-outside front wheel, may occur without causing the intended lateral sliding, in addition to the phenomena that the forward or backward movement of weight increases, the lateral sliding does not therefore occur properly, and the roll angle at the time of turning early increases.

SUMMARY

The invention is made in consideration of the above-mentioned circumstances. The object of the invention is to provide a vehicle motion control device that can suppress an increase in roll angle and can early suppress an increase in understeering if the increase in understeering is made to be unnecessary.

An aspect of the invention provides the following arrangements.

(1) A vehicle motion control device comprising:
a vehicle speed acquiring unit configured to acquire a vehicle speed of a vehicle;
a vehicle wheel speed acquiring unit configured to acquire wheel speeds of vehicle wheels of the vehicle, respectively;
a lateral acceleration acquiring unit configured to acquire an actual lateral acceleration actually generated in the vehicle;
an actual slip ratio acquiring unit configured to acquire an actual slip ratio actually generated in the vehicle based on the vehicle speed acquired by the vehicle speed acquiring unit and the vehicle wheel speed acquired by the vehicle wheel speed acquiring unit;
a steering angle acquiring unit configured to acquire a steering angle (Sa) based on a driver's operation;
a lateral acceleration calculating unit configured to calculate a steering angle lateral acceleration which is a lateral acceleration corresponding to the steering angle acquired by the steering angle acquiring unit;
a mode setting unit configured to set a rolling control mode if the actual lateral acceleration acquired by the lateral acceleration acquiring unit is equal to or greater than a target lateral acceleration at which a roll-suppressing control of suppressing rolling of the vehicle should be performed;
a determination unit configured to determine whether the steering angle lateral acceleration calculated by the lateral acceleration calculating unit is less than the target lateral acceleration if the rolling control mode is set by the mode setting unit; and
a pressure-increasing inhibit unit configured to inhibit an increase of a wheel cylinder pressure of the wheel to be subjected to the roll-suppressing control if the determination unit determines that the steering angle lateral acceleration is less than the target lateral acceleration.

(2) The vehicle motion control device according to (1), wherein the pressure-increasing inhibit unit holds the wheel cylinder pressure if the increase of the wheel cylinder pressure of the wheel to be subjected to the roll-suppressing control is set.

(3) The vehicle motion control device according to (1), wherein the pressure-increasing inhibit unit sets the decrease of the wheel cylinder pressure if the increase of the wheel cylinder pressure of the vehicle to be subjected to the roll-suppressing control is set.

(4) The vehicle motion control device according to any one of (1) to (3), wherein the vehicle includes a truck.

(5) The vehicle motion control device according to any one of (1) to (6), wherein the mode setting unit sets the target lateral acceleration to be smaller as the height of the center of gravity of the vehicle becomes greater.

(6) A vehicle motion control device comprising:
a vehicle speed acquiring unit configured to acquire a vehicle speed of a vehicle;
a vehicle wheel speed acquiring unit configured to acquire wheel speeds of vehicle wheels of the vehicle, respectively;
a lateral acceleration acquiring unit configured to acquire an actual lateral acceleration actually generated in the vehicle;
an actual slip ratio acquiring unit configured to acquire an actual slip ratio actually generated in the vehicle based on the vehicle speed acquired by the vehicle speed acquiring unit and the vehicle wheel speed acquired by the vehicle wheel speed acquiring unit;
a yaw rate acquiring unit configured to acquire a yaw rate of the vehicle;
a yaw-rate lateral acceleration calculating unit configured to calculate a yaw-rate lateral acceleration which is a lateral acceleration corresponding to the yaw rate acquired by the yaw rate acquiring unit;
a mode setting unit configured to set a rolling control mode if the actual lateral acceleration acquired by the lateral acceleration acquiring unit is equal to or greater than a target lateral acceleration at which a roll-suppressing control of suppressing rolling of the vehicle should be performed;
a determination unit configured to determine whether the yaw-rate lateral acceleration calculated by the yaw-rate lateral acceleration calculating unit is less than the target lateral acceleration if the rolling control mode is set by the mode setting unit; and
a pressure-increasing inhibit unit configured to inhibit an increase of a wheel cylinder pressure of the wheel to be subjected to the roll-suppressing control if the determination unit determines that the yaw-rate lateral acceleration is less than the target lateral acceleration.

(7) The vehicle motion control device according to (6), wherein the pressure-increasing inhibit unit holds the wheel cylinder pressure if the increase of the wheel cylinder pressure of the wheel to be subjected to the roll-suppressing control is set.

(8) The vehicle motion control device according to (7), further comprising a pressure-increasing/decreasing setting unit configured to set the pressure-increasing/decreasing of the wheel cylinder pressure of the wheel to be controlled based on a target slip deviation which is a difference between a target slip ratio in the roll-suppressing control and the actual slip ratio acquired by the actual slip ratio acquiring unit for the wheel to be subjected to the roll-suppressing control if the roll-suppressing control is set by the mode setting unit, wherein in the case that the determination unit determines that the yaw-rate lateral acceleration is less than the target lateral acceleration the pressure-increasing inhibit unit sets the increase of the wheel cylinder pressure to 0 if the increase of the wheel cylinder pressure is set by the pressure-increasing/decreasing setting unit, and sets the decrease of the wheel cylinder pressure as it is if the decrease of the wheel cylinder pressure is set by the pressure-increasing/decreasing setting unit.

(9) The vehicle motion control device according to (6), wherein the pressure-increasing inhibit unit sets the decrease of the wheel cylinder pressure if the increase of the wheel cylinder pressure of the vehicle to be subjected to the roll-suppressing control is set.

(10) The vehicle motion control device according to any one of (6) to (9), wherein the vehicle includes a truck.

(11) The vehicle motion control device according to any one of (6) to (10), wherein the mode setting unit sets the target lateral acceleration to be smaller as the height of the center of gravity of the vehicle becomes greater.

With the arrangement (1), if the actual lateral acceleration is equal to or greater than the target lateral acceleration but the steering angle lateral acceleration is less than the target lateral acceleration, the increase of the W/C pressure of the vehicle to be controlled is inhibited. Accordingly, it is possible to suppress the increase in the roll angle by actively generating the understeering to suppress the rolling and to early suppress the increase in understeering if the increase in understeering is made to be unnecessary.

With the arrangement (6), if the actual lateral acceleration is equal to or greater than the target lateral acceleration but the yaw-rate lateral acceleration is less than the target lateral acceleration, the increase of the W/C pressure of the vehicle to be controlled is inhibited. Accordingly, it is possible to suppress the increase in the roll angle by actively generating the understeering to suppress the rolling and to early suppress the increase in understeering if the increase in the understeering is made to be unnecessary.

With the arrangement (8), even if the increase of the W/C pressure is set, it is possible to inhibit the increase of the W/C pressure of the vehicle to be controlled and to maintain the W/C pressure presently being generated. If the decrease of the W/C pressure is set, it is possible to preferentially perform the decrease of the W/C pressure to release the understeering.

With the arrangements (3) and (9), by setting the decrease of the wheel cylinder pressure in this manner, the understeering can be released early.

With the arrangements (4) and (10), as in a large-sized vehicle such as a truck, if understeering is intended to increase to generate lateral sliding but the intended lateral sliding is not generated and the pitching phenomenon about the turning-outside front wheel may occur, it is possible to more satisfactorily limit the understeering and to improve the traveling stability of a large-sized vehicle.

DESCRIPTION OF EXEMPLARY EMBODIMENTS

Hereinafter, of the invention will be described with reference to the accompanying drawings. In the below-described embodiments, elements equal or equivalent to each other are referenced by like reference numerals in the drawings.

First Embodiment

Figure 1:
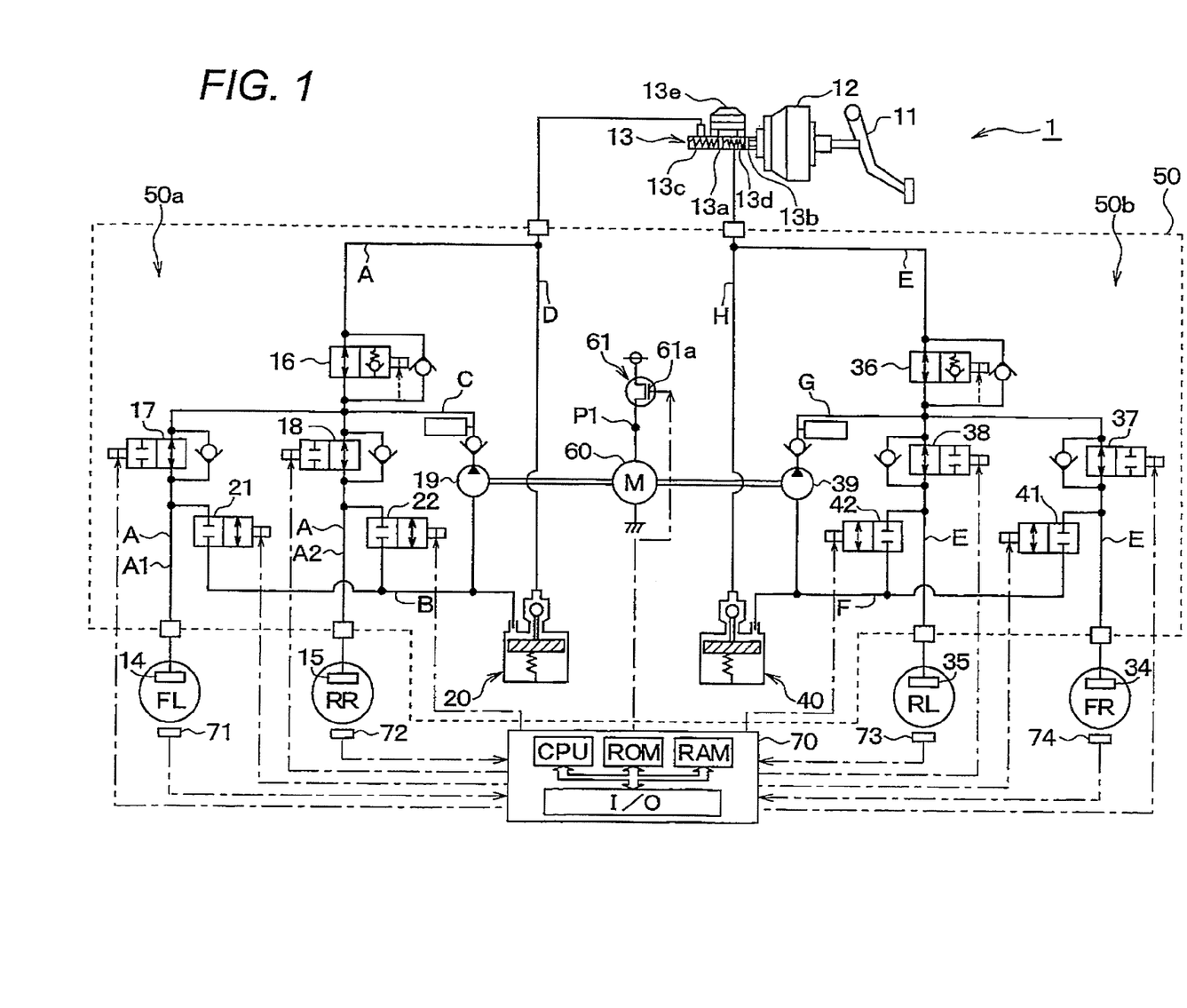
FIG. 1 is a diagram illustrating the entire configuration of a vehicle brake control system 1 implementing a vehicle motion control according to a first embodiment of the invention.

A first embodiment will be described. FIG. 1 is a diagram illustrating the entire configuration of a vehicle brake control system 1 implementing a vehicle motion control according to a first embodiment of the invention. The brake control system 1 according to this embodiment can be suitably applied to a large-sized vehicle such as a truck less than 5 t and the rolling of a vehicle is suppressed by performing a roll-suppressing control as a driving control of the vehicle by the brake control system 1. The brake control system 1 according to this embodiment will be described below with reference to FIG. 1.

As shown in FIG. 1, when a driver presses a brake pedal 11, the pressing force is boosted by a booster 12 to press master pistons 13a and 13b disposed in a M/C 13. Accordingly, the same M/C pressure is generated in a primary chamber 13c and a secondary chamber 13d partitioned by the master pistons 13a and 13b. The M/C pressure is transmitted to each W/C 14, 15, 34, and 35 via a hydraulic brake pressure controlling actuator 50.

Here, the M/C 13 includes a master reservoir 13e having a channel communicating with the primary chamber 13c and the secondary chamber 13d.

The hydraulic brake pressure controlling actuator 50 includes a first piping system 50a and a second piping system 50b. The first piping system 50a controls a hydraulic brake pressure applied to a front-left wheel FL and a rear-right wheel RR and the second piping system 50b controls a hydraulic brake pressure applied to a front-right wheel FR and a rear-left wheel RL. Since the first piping system 50a and the second piping system 50b have the same configuration, only the first piping system 50a will be described below and the second piping system 50b will not be described.

The first piping system 50a includes a pipe line A transmitting the M/C pressure to the W/C 14 of the front-left wheel FL and the W/C 15 of the rear-right wheel RR and serving as a main pipe line used to generate the W/C pressure.

The pipe line A includes a first differential pressure control valve 16 that can be switched between a communicating state and a differential-pressure state. In the first differential pressure control valve 16, the valve position is adjusted so as to be in the communicating state at the time of performing a normal braking operation of a driver's operating the brake pedal 11 (when a motion control is not performed) and the valve position is adjusted so as to be in the larger differential-pressure state as a current value increases if the current flows in a solenoid coil of the first differential pressure control valve 16.

If the first differential pressure control valve 16 is in the differential pressure state and the hydraulic brake pressure of the W/Cs 14 and 15 is only higher by a predetermined pressure than the M/C pressure, a brake fluid is allowed to flow from the W/Cs 14 and 15 to the M/C 13. Accordingly, the pressure of the W/Cs 14 and 15 is maintained so as not to be higher by the predetermined pressure than the pressure of the M/C 13.

The pipe line A is branched into two pipe lines A1 and A2 at a position close to the W/Cs 14 and 15 and downstream from the first differential pressure control valve 16. The pipe line A1 is provided with a first pressure-increasing control valve 17 that controls the pressure-increasing of the hydraulic brake pressure to the W/C 14 and the pipe line A2 is provided with a second pressure-increasing control valve 18 that controls the pressure-increasing of the hydraulic brake pressure to the W/C 15.

Each of the first and second pressure-increasing valves 17 and 18 includes a two-position electromagnetic valve that can be switched between a communicating state and a blocked state. Each of the first and second pressure-increasing control valves 17 and 18 is a normally-opened type which is switched to the communicating state if a control current to a solenoid coil of the first and second pressure-increasing control valves 17 and 18 is zero (at the time of the non-application of a current) and which is switched to the blocked state if the control current flows in the solenoid coil (at the time of the application of a current).

In a pipe line B as a pressure-decreasing pipe line connecting the pressure-adjusting reservoir 20 to points between the first and second pressure-increasing control valves 17 and 18 and the W/Cs 14 and 15 in the pipe line A, a first pressure-decreasing control valve 21 and a second pressure-decreasing control valve 22 that can be switched between a communicating state and a blocked state and that include a two-position electromagnetic valve are disposed. The first and second pressure-decreasing control valves 21 and 22 are a normally-closed type.

A pipe line C serving as a reflux pipe line is disposed between the pressure-adjusting reservoir 20 and the pipe line A as a main pipe line. The pipe line C is provided with a self-suction pump 19 that suctions and ejects a brake fluid from the pressure-adjusting reservoir 20 to the M/C 13 or the W/Cs 14 and 15 and that is driven by a motor 60. In the motor 60, the supply of a voltage to the motor 60 is controlled by controlling the ON and OFF states of a semiconductor switch 61a included in a motor relay 61.

A pipe line D serving as an auxiliary pipe line is disposed between the pressure-adjusting reservoir 20 and the M/C 13. By causing the pump 19 to suction the brake fluid from the M/C 13 and to eject the brake fluid to the pipe line A, the brake fluid is supplied to the W/Cs 14 and 15 at the time of performing a motion control such as a roll-suppressing control or a traction (TCS) control, thereby increasing the W/C pressure of a target wheel.

The constituent elements of the second piping system 50b correspond to the constituent elements of the first piping system 50a. Specifically, a second differential pressure control valve 36 corresponds to the first differential control valve 16, third and fourth pressure-increasing control valves 37 and 38 correspond to the first and second pressure-increasing control valves, third and fourth pressure-decreasing control valves 41 and 42 correspond to the first and second pressure-decreasing control valves 21 and 22, a pump 39 corresponds to the pump 19, and a pressure-adjusting reservoir 40 corresponds to the pressure-adjusting reservoir 20. Pipe lines E to H correspond to the pipe lines A to D.

Figure 2:
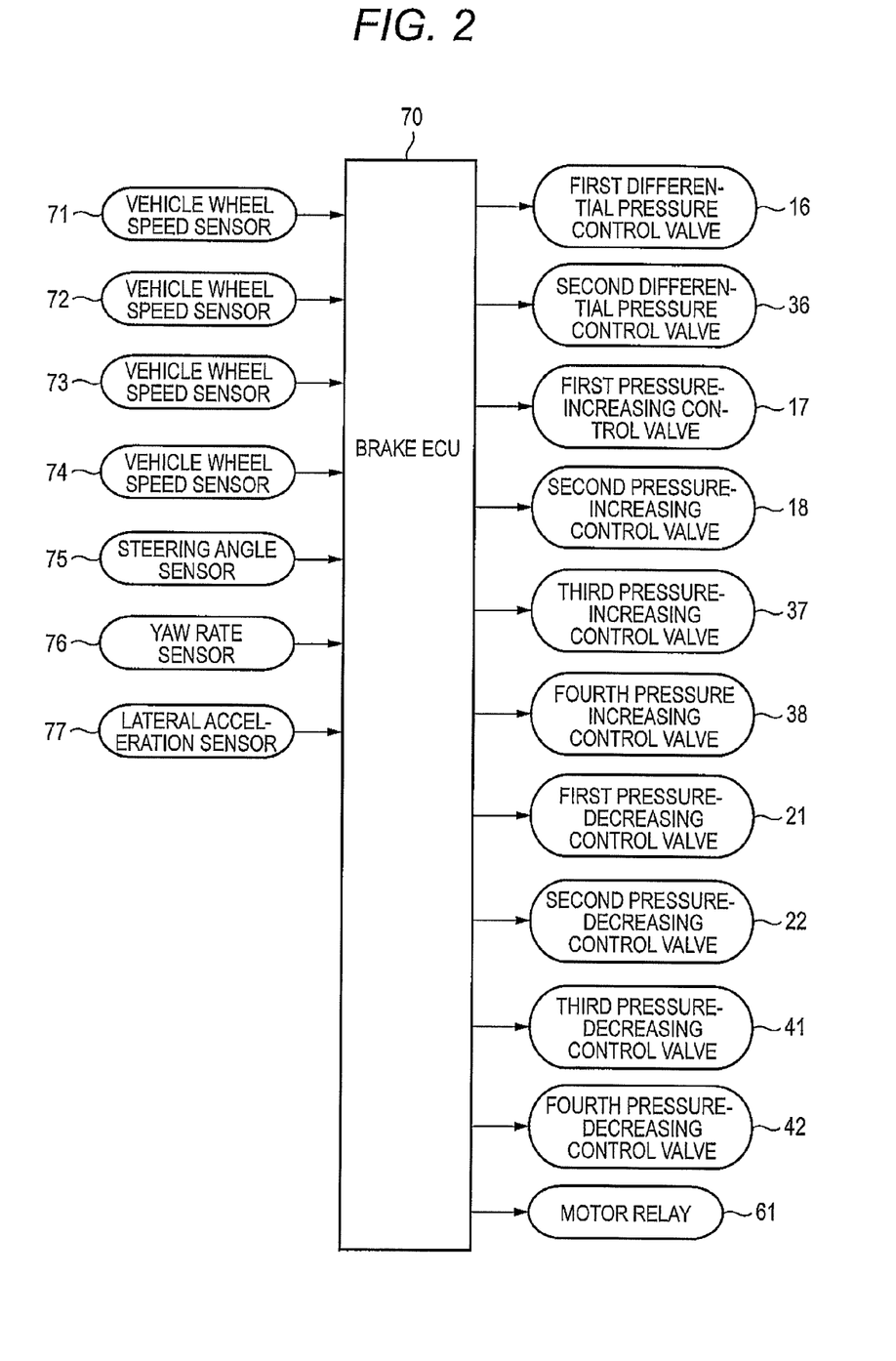
FIG. 2 is a block diagram illustrating the relation between an input and an output of a signal in a brake ECU 70.

A brake ECU 70 corresponds to a vehicle motion control device according to the invention serving as a control system of the brake control system 1, includes a micro computer including a CPU, a ROM, a RAM, and an I/O, and performs a variety of calculation processes in accordance with programs stored in the ROM or the like. FIG. 2 is a block diagram illustrating the relation between an input and an output of signals in the brake ECU 70.

As shown in FIG. 2, the brake ECU 70 receives detection signals from vehicle wheel speed sensors 71 to 74 of the vehicle wheels FL to RR, a steering angle sensor 75, a yaw rate sensor 76, and a lateral acceleration sensor 77 and calculates various physical quantities. For example, the brake ECU 70 calculates vehicle wheel speeds of the vehicle wheels FL to RR, a vehicle speed (estimated vehicle speed), slip ratios of the vehicle wheels, a steering angle, a yaw rate, and a lateral acceleration based on the detection signals. The brake ECU 70 determines a wheel to be subjected to a roll-suppressing control or calculates a control amount, that is, the W/C pressure generated in the W/C of the wheel to be controlled. Based on the result, the brake ECU 70 performs a current supply control to the control valves 16 to 18, 21, 22, 36 to 38, 41, and 42 and a current control of the motor 60 used to drive the pumps 19 and 39.

For example, if the W/C pressure is generated in the front-left wheel FL as the wheel to be controlled, the first differential pressure control valve 16 is switched to a differential pressure state and the motor relay 61 is turned on to drive the pump 19 using the motor 60. Accordingly, the hydraulic brake pressure downstream (close to the W/C) from the first differential pressure control valve 16 increases by the differential pressure generated in the first differential pressure control valve 16. At this time, the W/C 15 is not increased in pressure by switching the second pressure-increasing control valve 18 corresponding to the rear-right wheel RR not to be controlled to the blocked state, and a desired W/C pressure is generated in the W/C 14 by controlling the first pressure-increasing control valve 17 and the first pressure-decreasing control valve 21 corresponding to the front-left wheel FL to be controlled.

Specifically, a pressure decreasing mode where the W/C pressure is decreased by duty-controlling the communicating state and the blocked state of the first pressure-decreasing control valve 21 while switching the first pressure-increasing control valve 17 to the blocked state, a holding mode where the W/C pressure is held by switching both the first pressure-increasing control valve 17 and the first pressure-decreasing control valve 21 to the blocked state, and a pressure increasing mode where the W/C pressure is increased by duty-controlling the communicating state and the blocked state of the first pressure-increasing control valve 17 while switching the first pressure-decreasing valve 21 to the blocked state are appropriately switched to adjust the W/C pressure.

The pump 39 is also driven by the motor 60. However, if the second differential pressure control valve 36 is not in the differential pressure state, the W/Cs 34 and 35 are not increased in pressure by only circulating the brake fluid.

In this way, the brake control system 1 according to this embodiment is constructed. The specific behavior of the brake control system 1 will be described below. In the brake control system 1, an anti-skid (ABS) control or the like can be also performed as a motion control in addition to a normal brake control and the basic behavior is the same as in the related art. Accordingly, the roll-suppressing control process associated with the feature of the invention will be described.

Figure 3:
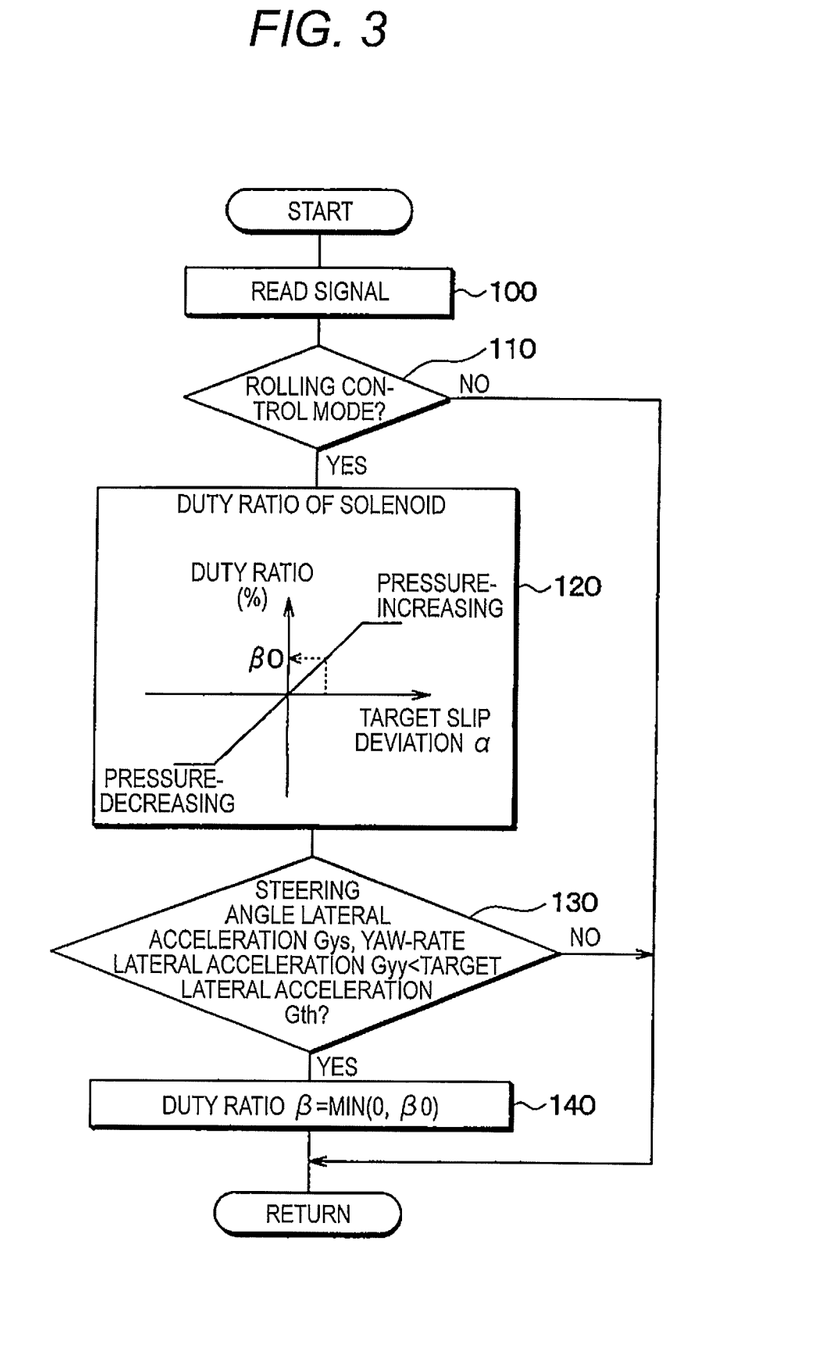
FIG. 3 is a flow diagram illustrating an entire roll-suppressing control process performed in accordance with a program by the brake ECU 70.

FIG. 3 is a flow diagram illustrating the roll-suppressing control process performed in accordance with programs by the brake ECU 70 as a whole. The roll-suppressing control process is performed when an ignition switch (not shown) disposed in the vehicle is turned on or every predetermined calculation period during the vehicle traveling.

First, in step 100, a sensor signal reading process is performed. That is, various detection signals necessary for the roll-suppressing control, such as the detection signals from the vehicle wheel speed sensors 71 to 74, the steering angle sensor 75, the yaw rate sensor 76, and the lateral acceleration sensor 77 are read and the physical quantities are calculated from the read detection signals.

Specifically, the vehicle wheel speeds of the vehicle wheels FL to RR are calculated based on the detection signals of the vehicle wheel speed sensors 71 to 74, the vehicle speed (estimated vehicle speed) is calculated from the vehicle wheel speeds using a known method, and the actual slip ratios are calculated which are expressed by a deviation between the vehicle speed and the vehicle wheel speeds (vehicle speed-vehicle wheel speed/vehicle speed). The steering angle Sa, the yaw rate Yr, and the lateral acceleration Gy are calculated based on the detection signals of the steering angle sensor 75, the yaw rate sensor 76, and the lateral acceleration sensor 77. The lateral acceleration Gy based on the steering angle Sa is calculated by multiplying the calculated steering angle Sa by the vehicle speed to calculate the steering angle yaw rate and multiplying the vehicle speed thereby, and the lateral acceleration Gy based on the yaw rate Yr is calculated by multiplying the calculated yaw rate Yr by the vehicle speed. Hereinafter, the lateral acceleration Gy based on the steering angle Sa is referred to as a steering angle lateral acceleration Gys and the lateral acceleration Gy based on the yaw rate Yr is referred to as a yaw-rate lateral acceleration Gyy, and the actual lateral acceleration Gy detected by the yaw rate sensor 76 is referred to as an actual lateral acceleration Gyr. The plus and minus signs of the steering angle Sa, the yaw rate Yr, and the lateral acceleration Gy are inverted depending on the right and left and any direction may be defined as a plus direction.

In step 110, it is determined whether the roll-suppressing mode is set. Specifically, by comparing the actual lateral acceleration Gyr detected in step 100 with a target lateral acceleration Gth defined in advance as a threshold value used to perform the roll-suppressing control, it is determined whether the actual lateral acceleration Gyr is equal to or greater than the target lateral acceleration Gth. Here, if the determination result is affirmative, the roll-suppressing mode is set and the process of step 120 is then performed. If the determination result is negative, a normal mode where it is not necessary to perform the roll-suppressing control is set and the flow of processes is ended.

If the roll-suppressing mode is set in step 110, the turning direction can be seen from the steering angle Sa detected in step 100. Accordingly, the wheel to be subjected to the roll-suppressing control is set on the basis thereof. For example, only the turning-outside front wheel is set as the wheel to be controlled, both the turning-outside front and rear wheels are set as the wheels to be controlled, or three wheels of the turning-outside front and rear wheels and the turning-inside rear wheel are set as the wheels to be controlled.

Thereafter, the processes of step 120 or steps subsequent thereto are performed. The processes of step 120 or steps subsequent thereto are sequentially repeated for all the wheels to be controlled among the vehicle wheels FL to RR. If the processes are performed on all wheel(s) to be controlled, the roll-suppressing control process is repeated from step 100 again.

In step 120, the duty ratio of the solenoid is set. Specifically, in order to understeering the vehicle to suppress the roll angle, a target slip deviation α is calculated in which the turning-outside front wheel is actively made to slip to cause the lateral sliding and the duty ratio β0 corresponding to the target slip deviation α is calculated. The target slip deviation α means a difference between the target slip ratio and the actual slip ratio calculated in step 100. The target slip ratio is basically set to be constant. However, since the target slip ratio necessary for causing the lateral sliding varies depending on vehicle conditions (for example, the steering angle Sa or the vehicle speed), the target slip ratio may be set to be variable depending on the vehicle conditions or the like.

The duty ratio of the solenoid means the current-supply duty to the pressure-increasing control valve 17, 18, 37, or 38 or the pressure-decreasing control valve 21, 22, 41, or 42 of the wheel to be controlled. As the current-supply duty to the pressure-increasing control valve 17, 18, 37, or 38 increases, the pressure-increasing amount of the W/C pressure increases. As the current-supply duty to the pressure-decreasing control valve 21, 22, 41, or 42 increases, the pressure-decreasing amount of the W/C pressure increases. Accordingly, by controlling the pressure-increasing control valve 17, 18, 37, or 38 or the pressure-decreasing control valve 21, 22, 41, or 42 of the target wheel to control the increase or decrease of the W/C pressure, it is possible to control the braking force generated in the target wheel and to adjust the slip ratio.

In step 130, it is determined whether at least one of the steering angle lateral acceleration Gys and the yaw-rate lateral acceleration Gyy is less than the target lateral acceleration Gth. That is, if it is determined in step 110 that the actual lateral acceleration Gyr is equal to or greater than the target lateral acceleration Gth and the steering angle lateral acceleration Gys or the yaw-rate lateral acceleration Gyy is less than the target lateral acceleration Gth, the strong understeering is generated already and thus it is not necessary to increase the understeering any more, or the vehicle can travel along an appropriate lane of a road and thus the driver returns the steering wheel. In these situations, it is not necessary to increase the understeering any more.

Figure 4:
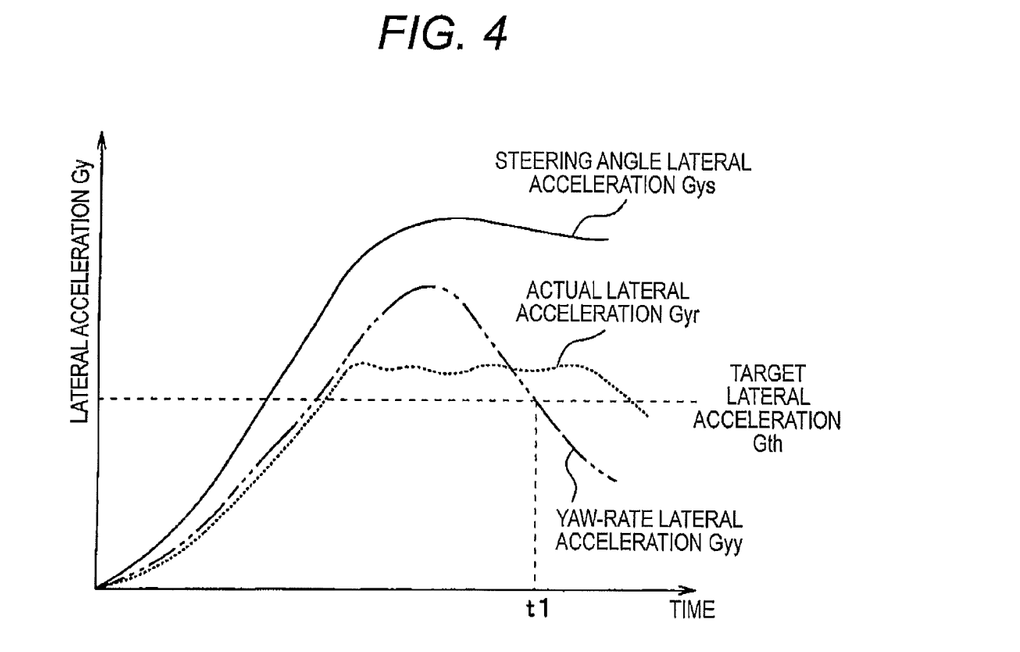
FIG. 4 is a timing diagram illustrating a variation in a steering angle lateral acceleration Gys and an actual lateral acceleration Gyr if strong understeering occurs already and it is not necessary to increase the understeering any more.
Figure 5:
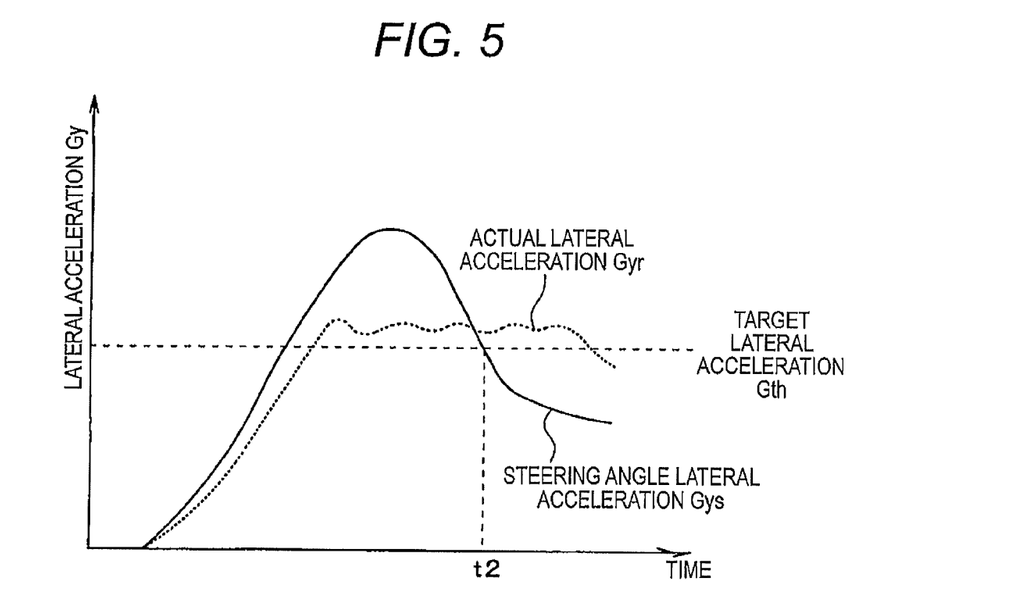
FIG. 5 is a timing diagram illustrating a variation in a steering angle lateral acceleration Gys and an actual lateral acceleration Gyr when a driver returns a steering wheel.

FIG. 4 is a timing diagram illustrating a variation in the steering angle lateral acceleration Gys and the actual lateral acceleration Gyr in the state where the strong understeering is generated already and thus it is not necessary to increase the understeering any more. FIG. 5 is a timing diagram illustrating a variation in the steering angle lateral acceleration Gys and the actual lateral acceleration Gyr in the state where the driver returns the steering wheel. As shown in the drawings, the actual lateral acceleration Gyr has a response characteristic slower than that of the yaw rate Yr or the steering angle Sa and varies after the yaw rate Yr or the steering angle Sa varies. Particularly, in a large-sized vehicle such as a truck, it takes a time for the actual lateral acceleration Gyr to vary. Accordingly, if the actual lateral acceleration Gyr is equal to or greater than the target lateral acceleration Gth, the steering angle lateral acceleration Gys or the yaw-rate lateral acceleration Gyy may be less than the target lateral acceleration Gth.

Accordingly, in this state, it is necessary to suppress the increases of the understeering. Particularly, in the large-sized vehicle such as a truck, even if it is intended to increase the understeering to cause the lateral sliding, the intended lateral sliding is not caused and a pitching phenomenon about the turning-outside front wheel may be caused. Accordingly, it is preferable that the understeering is limited more appropriately.

Accordingly, if the determination result in step 130 is affirmative, a duty ratio correcting process is performed and various control valves are driven by the corrected duty ratio β in step 140. In the duty ratio correcting process, the calculation of MIN(0, β0), that is, a process of selecting the smaller of 0 and the duty ratio β0 set in step 120, is performed.

As described above, in the state where the determination result in step 130 is affirmative, it is necessary to further suppress the increase of the understeering and it is thus necessary to prevent the increase of the braking force of the target wheel. Accordingly, the corrected duty ratio β is set to 0 if the duty ratio β0 is set to a value for increasing the W/C pressure, and the duty ratio β0 is set to the corrected duty ratio β if the duty ratio β0 is set to a value for decreasing the W/C pressure. By setting the duty ratio β in this way, it is possible to inhibit the increase of the W/C pressure of the target wheel and to hold the present W/C pressure even if the duty ratio β0 is set to the value for increasing the W/C pressure. If the duty ratio β0 is set to the value for decreasing the W/C pressure, the decrease of the W/C pressure is preferentially performed to release the understeering.

If the determination result in step 130 is negative, it means that the understeering can be increased. Accordingly, the duty ratio β0 set in step 120 is set as it is and various control valves are driven in accordance with the duty ratio β0.

As described above, in the brake control system 1 according to this embodiment, even if the actual lateral acceleration Gyr is equal to or greater than the target lateral acceleration Gth but at least one of the steering angle lateral acceleration Gys and the yaw-rate lateral acceleration Gyy is less than the target lateral acceleration Gth (at time t1 in FIG. 4 and at time t2 in FIG. 5), the increase of the W/C pressure of the target wheel is inhibited. Accordingly, it is possible to suppress the increase of the roll angle by actively generating the understeering so as to suppress the rolling and it is possible to early suppress the increase of the understeering if the increase in understeering is made to be unnecessary.

Accordingly, in the state where the strong understeering is already generated and it is not necessary to increase the understeering any more or the state where the vehicle can appropriately travel along a road lane and the driver returns the steering wheel, it is possible to early suppress the increase in understeering. Particularly, in the large-sized vehicle such as a truck, if it is intended to increase the understeering so as to cause the lateral sliding but the intended lateral sliding is not caused and the pitching phenomenon about the turning-outside front wheel may be caused, it is possible to more appropriately limit the understeering and to improve the traveling stability of the large-sized vehicle.

As described above, since it is possible to suppress the increase in understeering in early stage, it is possible to more easily control the vehicle behavior according to the intention by the driver, thereby improving a tracing characteristic to a vehicle traveling trace intended by the driver.

Other Embodiments (1) Although it has been described in the above-mentioned embodiments that the target lateral acceleration Gth which is a threshold value used to perform the roll-suppressing control is set to be constant, the target lateral acceleration Gth may be set to be variable depending on the vehicle condition. For example, as the height of the center of gravity of a vehicle increases, the target lateral acceleration Gth may be set to a lower value, whereby the roll-suppressing control can be more performed depending on the height of the center of gravity of the vehicle. The height of the center of gravity of the vehicle can be measured by a height sensor of the center of gravity or can be estimated from the total weight of the vehicle or the load weight thereof. Accordingly, the brake ECU 70 may store a function expression or a map representing the value of the target lateral acceleration Gth for the height of the center of gravity and may read the target lateral acceleration Gth corresponding to the measured value or the estimated value from the function expression or the map.

(2) In the above-mentioned embodiments, it has been exemplified that the roll-suppressing control is performed in the state where the driver does not press the brake pedal 11 and the braking force is not generated. However, even if the braking force is generated, the roll-suppressing control may be performed. In this case, by further increasing the braking force generated in the turning-outside front wheel or the turning-inside front wheel before the roll-suppressing control, the roll-suppressing control is performed.

(3) It has been described in the above-mentioned embodiments that the increase of the W/C pressure of the target wheel is inhibited if any one of the steering angle lateral acceleration Gys and the yaw-rate lateral acceleration Gyr is less than the target lateral acceleration Gth, and the W/C pressure is held without increasing the W/C pressure if the duty ratio β0 is set to the value for increasing the W/C pressure. On the contrary, the understeering may be earlier released by decreasing the W/C pressure instead of holding the W/C pressure.

(4) The steps shown in the drawings correspond to units for performing various processes. For example, the part performing the process of step 100 in FIG. 3 corresponds to the vehicle speed acquiring unit, the vehicle wheel speed acquiring unit, the actual lateral acceleration acquiring unit, the actual slip ratio acquiring unit, the steering angle acquiring unit, the lateral acceleration calculating unit, the yaw rate acquiring unit, and the yaw-rate lateral acceleration calculating unit. The part performing the process of step 110 corresponds to the mode setting unit, the part performing the process of step 120 corresponds to the pressure-increasing/decreasing setting unit, the part performing the process of step 130 corresponds to the determination unit, and the part performing the process of step 140 corresponds to the pressure-increasing inhibit unit.

What is claimed is:
1. A vehicle motion controller comprising:
   a vehicle speed acquiring unit configured to acquire a vehicle speed of a vehicle;
   a vehicle wheel speed acquiring unit configured to acquire wheel speeds of vehicle wheels of the vehicle, respectively;
   a lateral acceleration acquiring unit configured to acquire an actual lateral acceleration actually generated in the vehicle;
   an actual slip ratio acquiring unit configured to acquire an actual slip ratio actually generated in the vehicle based on the vehicle speed acquired by the vehicle speed acquiring unit and the vehicle wheel speed acquired by the vehicle wheel speed acquiring unit;
   a steering angle acquiring unit configured to acquire a steering angle based on a driver's operation;

a lateral acceleration calculating unit configured to calculate a steering angle lateral acceleration which is a lateral acceleration corresponding to the steering angle acquired by the steering angle acquiring unit;

a mode setting unit configured to set a rolling control mode if the actual lateral acceleration acquired by the lateral acceleration acquiring unit is equal to or greater than a target lateral acceleration at which a roll-suppressing control of suppressing rolling of the vehicle should be performed;

a determination unit configured to determine whether the steering angle lateral acceleration calculated by the lateral acceleration calculating unit is less than the target lateral acceleration if the rolling control mode is set by the mode setting unit; and a pressure-increasing prevention unit configured to prevent an increase of a wheel cylinder pressure of the wheel to be subjected to the roll-suppressing control without exiting the rolling control mode based on a determination by the determination unit that the steering angle lateral acceleration is less than the target lateral acceleration.

2. The vehicle motion controller according to claim 1, wherein the pressure-increasing prevention unit holds the wheel cylinder pressure if the increase of the wheel cylinder pressure of the wheel to be subjected to the roll-suppressing control is set.

3. The vehicle motion controller according to claim 1, wherein the pressure-increasing prevention unit sets the decrease of the wheel cylinder pressure if the increase of the wheel cylinder pressure of the vehicle to be subjected to the roll-suppressing control is set.

4. The vehicle motion controller according to claim 1, wherein the mode setting unit sets the target lateral acceleration to be smaller as the height of the center of gravity of the vehicle becomes greater.

5. A vehicle motion controller comprising:
a vehicle speed acquiring unit configured to acquire a vehicle speed of a vehicle;
a vehicle wheel speed acquiring unit configured to acquire wheel speeds of vehicle wheels of the vehicle, respectively;
a lateral acceleration acquiring unit configured to acquire an actual lateral acceleration actually generated in the vehicle;
an actual slip ratio acquiring unit configured to acquire an actual slip ratio actually generated in the vehicle based on the vehicle speed acquired by the vehicle speed acquiring unit and the vehicle wheel speed acquired by the vehicle wheel speed acquiring unit;
a yaw rate acquiring unit configured to acquire a yaw rate of the vehicle;
a yaw-rate lateral acceleration calculating unit configured to calculate a yaw-rate lateral acceleration which is a lateral acceleration corresponding to the yaw rate acquired by the yaw rate acquiring unit;
a mode setting unit configured to set a rolling control mode if the actual lateral acceleration acquired by the lateral acceleration acquiring unit is equal to or greater than a target lateral acceleration at which a roll-suppressing control of suppressing rolling of the vehicle should be performed;
a determination unit configured to determine whether the yaw-rate lateral acceleration calculated by the yaw-rate lateral acceleration calculating unit is less than the target lateral acceleration if the rolling control mode is set by the mode setting unit; and a pressure-increasing prevention unit configured to prevent an increase of a wheel cylinder pressure of the wheel to be subjected to the roll-suppressing control without exiting the rolling control mode based on a determination by the determination unit that the yaw-rate lateral acceleration is less than the target lateral acceleration.

6. The vehicle motion controller according to claim 5, wherein the pressure-increasing prevention unit holds the wheel cylinder pressure if the increase of the wheel cylinder pressure of the wheel to be subjected to the roll-suppressing control is set.

7. The vehicle motion controller according to claim 6, further comprising a pressure-increasing/decreasing setting unit configured to set the pressure-increasing/decreasing of the wheel cylinder pressure of the wheel to be controlled based on a target slip deviation which is a difference between a target slip ratio in the roll-suppressing control and the actual slip ratio acquired by the actual slip ratio acquiring unit for the wheel to be subjected to the roll-suppressing control if the roll-suppressing control is set by the mode setting unit,
wherein in the case that the determination unit determines that the yaw-rate lateral acceleration is less than the target lateral acceleration the pressure-increasing prevention unit sets the increase of the wheel cylinder pressure to 0 if the increase of the wheel cylinder pressure is set by the pressure-increasing/decreasing setting unit, and sets the decrease of the wheel cylinder pressure as it is if the decrease of the wheel cylinder pressure is set by the pressure-increasing/decreasing setting unit.

8. The vehicle motion controller according to claim 5, wherein the pressure-increasing prevention unit sets the decrease of the wheel cylinder pressure if the increase of the wheel cylinder pressure of the vehicle to be subjected to the roll-suppressing control is set.

9. The vehicle motion controller according to claim 5, wherein the mode setting unit sets the target lateral acceleration to be smaller as the height of the center of gravity of the vehicle becomes greater.

10. A non-transitory computer readable medium storing a program which, when executed, causes a vehicle motion controller to perform:
acquiring a vehicle speed of a vehicle;
acquiring wheel speeds of vehicle wheels of the vehicle, respectively;
acquiring an actual lateral acceleration actually generated in the vehicle;
acquiring an actual slip ratio actually generated in the vehicle based on the acquired vehicle speed and the acquired vehicle wheel speed;
acquiring a steering angle based on a driver's operation;
calculating a steering angle lateral acceleration which is a lateral acceleration corresponding to the acquired steering angle;
setting a rolling control mode if the acquired actual lateral acceleration is equal to or greater than a target lateral acceleration at which a roll-suppressing control of suppressing rolling of the vehicle should be performed;
determining whether the calculated steering angle lateral acceleration is less than the target lateral acceleration if the rolling control mode is set; and
preventing an increase of a wheel cylinder pressure of the wheel to be subjected to the roll-suppressing control without exiting the rolling control mode based on a determination that the steering angle lateral acceleration is less than the target lateral acceleration.

11. The non-transitory computer readable medium according to claim 10, wherein the wheel cylinder pressure is held in the step of preventing the increase of the wheel cylinder pressure if the increase of the wheel cylinder pressure of the wheel to be subjected to the roll-suppressing control is set.

12. The non-transitory computer readable medium according to claim 10, wherein the decrease of the wheel cylinder pressure is set in the step of preventing the increase of the wheel cylinder pressure if the increase of the wheel cylinder pressure of the vehicle to be subjected to the roll-suppressing control is set.

13. The non-transitory computer readable medium according to claim 10, wherein the target lateral acceleration is set to be smaller as the height of the center of gravity of the vehicle becomes greater.

14. A non-transitory computer readable medium storing a program which, when executed, causes a vehicle motion controller to perform:
  acquiring a vehicle speed of a vehicle;
  acquiring wheel speeds of vehicle wheels of the vehicle, respectively;
  acquiring an actual lateral acceleration actually generated in the vehicle;
  acquiring an actual slip ratio actually generated in the vehicle based on the acquired vehicle speed and the acquired vehicle wheel speed;
  acquiring a yaw rate of the vehicle;
  calculating a yaw-rate lateral acceleration which is a lateral acceleration corresponding to the acquired yaw rate;
  setting a rolling control mode if the acquired actual lateral acceleration is equal to or greater than a target lateral acceleration at which a roll-suppressing control of suppressing rolling of the vehicle should be performed;
  determining whether the calculated yaw-rate lateral acceleration is less than the target lateral acceleration if the rolling control mode is set; and
  preventing an increase of a wheel cylinder pressure of the wheel to be subjected to the roll-suppressing control without exiting the rolling control mode based on a determination that the yaw-rate lateral acceleration is less than the target lateral acceleration.

15. The non-transitory computer readable medium according to claim 14, wherein the wheel cylinder pressure is held in the step of preventing the increase of the wheel cylinder pressure if the increase of the wheel cylinder pressure of the wheel to be subjected to the roll-suppressing control is set.

16. The non-transitory computer readable medium according to claim 15, wherein the program, when executed, causes the vehicle motion controller to further perform:
  setting a pressure-increasing/decreasing of the wheel cylinder pressure of the wheel to be controlled based on a target slip deviation which is a difference between a target slip ratio in the roll-suppressing control and the acquired actual slip ratio for the wheel to be subjected to the roll-suppressing control if the roll-suppressing control is set,
  wherein, in the case that it is determined that the yaw-rate lateral acceleration is less than the target lateral acceleration, the increase of the wheel cylinder pressure is set to 0 in the step of preventing the increase of the wheel cylinder pressure if the increase of the wheel cylinder pressure is set in the step of setting the pressure-increasing/decreasing of the wheel cylinder pressure, and the decrease of the wheel cylinder pressure is set as it is in the step of preventing the increase of the wheel cylinder pressure if the decrease of the wheel cylinder pressure is set in the step of setting the pressure-increasing/decreasing of the wheel cylinder pressure.

17. The non-transitory computer readable medium according to claim 14, wherein the decrease of the wheel cylinder pressure is set in the step of preventing the increase of the wheel cylinder pressure if the increase of the wheel cylinder pressure of the vehicle to be subjected to the roll-suppressing control is set.

18. The non-transitory computer readable medium according to claim 14, wherein the target lateral acceleration is set to be smaller as the height of the center of gravity of the vehicle becomes greater.

* * * * *